(12) United States Patent
Hayashi

(10) Patent No.: US 10,515,497 B2
(45) Date of Patent: Dec. 24, 2019

(54) ON-VEHICLE DEVICE, MOBILE DEVICE, AND WIRELESS COMMUNICATION SYSTEM FOR VEHICLES

(71) Applicant: Panasonic Intellectual Property Management Co., Ltd., Osaka (JP)

(72) Inventor: Naoki Hayashi, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/991,731

(22) Filed: May 29, 2018

(65) Prior Publication Data

US 2018/0276923 A1    Sep. 27, 2018

Related U.S. Application Data

(63) Continuation of application No. PCT/JP2016/004989, filed on Nov. 29, 2016.

(30) Foreign Application Priority Data

Dec. 10, 2015   (JP) ................................ 2015-241436

(51) Int. Cl.
*G07C 9/00* (2006.01)
*H04Q 9/00* (2006.01)
(Continued)

(52) U.S. Cl.
CPC ........ *G07C 9/00309* (2013.01); *B60R 25/246* (2013.01); *G06F 21/35* (2013.01);
(Continued)

(58) Field of Classification Search
CPC ...... G07C 9/00309; G07C 2009/00555; G07C 2009/00357; B60R 25/246; B60R 25/245;
(Continued)

(56) References Cited

U.S. PATENT DOCUMENTS 9,496,936 B2 * 11/2016 Blatz ................. G07C 9/00309
2008/0143500 A1    6/2008 Ghabra et al.
(Continued)

FOREIGN PATENT DOCUMENTS

DE    102014200444 A1    7/2014
JP    2011-052506 A      3/2011

OTHER PUBLICATIONS

International Search Report of PCT application No. PCT/JP2016/004989 dated Feb. 21, 2017.

*Primary Examiner* — Brian Wilson
(74) *Attorney, Agent, or Firm* — Seed IP Law Group LLP

(57) ABSTRACT

A transmitter of an on-vehicle device transmits a request signal from a first antenna, and transmits first measurement signals at different timings from the first antenna and a second antenna. The receiver receives a first response signal including information on transmission intensities of a second measurement signals to be transmitted from the first and second antennas. The transmitter further transmits the second measurement signals at different timings from the first and second antennas. The second measurement signals have transmission intensities respectively set based on the information on transmission intensities included in the first response signal. The receiver receives a second response signal transmitted when a relationship between the reception intensities of the second measurement signals transmitted from the first and second antennas agrees with the information on the transmission intensities included in the first response signal.

20 Claims, 9 Drawing Sheets

(51) Int. Cl.
    *B60R 25/24*     (2013.01)
    *G06F 21/35*     (2013.01)

(52) U.S. Cl.
    CPC .............. *H04Q 9/00* (2013.01); *B60R 25/245* (2013.01); *G07C 2009/00357* (2013.01); *G07C 2009/00555* (2013.01); *H04Q 2209/40* (2013.01); *H04Q 2209/50* (2013.01)

(58) Field of Classification Search
    CPC .. H04Q 9/00; H04Q 2209/50; H04Q 2209/40; H04B 1/59; G06F 21/44; G06F 21/35
    See application file for complete search history.

(56) References Cited

U.S. PATENT DOCUMENTS

2012/0229254 A1*   9/2012   Nowottnick ....... G07C 9/00309
                                                    340/5.61
2014/0203907 A1     7/2014   Ohata et al.

\* cited by examiner

200

200

ON-VEHICLE DEVICE, MOBILE DEVICE, AND WIRELESS COMMUNICATION SYSTEM FOR VEHICLES

CROSS-REFERENCE TO RELATED APPLICATIONS

This application is a continuation of the PCT International Application No. PCT/JP2016/004989 filed on Nov. 29, 2016, which claims the benefit of foreign priority of Japanese patent application No. 2015-241436 filed on Dec. 10, 2015, the contents all of which are incorporated herein by reference.

BACKGROUND

1. Technical Field

The present disclosure relates to a communication technology, and more particularly to an on-vehicle device installed in a vehicle, a mobile device carried by a user, and a wireless communication system for vehicles, which establishes communication between the on-vehicle device and the mobile device.

2. Description of the Related Art

Electronic key systems include a key operation free system that does not require button operations for an electronic key. In this system, a communication area of requests in LF (Low Frequency) band is formed around the vehicle. When an electronic key enters this communication area and accepts a request, the electronic key returns a response in RF (Radio Frequency) band to the vehicle. A relay attack is one of unauthorized uses of the key operation free system. In the relay attack, a third party with malicious intentions uses a repeater that can relay both requests from the vehicle and responses from the electronic key. Communication between the two parties thus become feasible even though the electronic key is not present in the vehicle communication area. To prevent relay attacks, a signal intensity pattern between the vehicle and electronic key is specified and the signal intensity pattern is collated (e.g., Unexamined Japanese Patent Publication No. 2011-52506).

SUMMARY

The present disclosure provides a technology of reducing the risk of a relay attack for door unlocking.

One aspect of the present disclosure is an on-vehicle device. The on-vehicle device includes first and second antennas, a transmitter, and a receiver. The transmitter is connected to the first and second antennas, and performs signal transmission to an outside from the first and second antennas. The receiver receives a signal from the outside. The transmitter transmits a request signal from the first antenna, and transmits first measurement signals at different timings from the first antenna and the second antenna. The receiver receives a first response signal that includes information on transmission intensities of second measurement signals to be transmitted by the transmitter from the first antenna and second antenna. The first response signal is transmitted in response to the request signal and the first measurement signals that have been transmitted by the transmitter. The transmitter further transmits, at different timings from the first antenna and second antenna, the second measurement signals having the transmission intensities set on the basis of the information on the transmission intensities included in the first response signal. The receiver receives a second response signal. The second response signal is transmitted under the following condition: a relationship between a reception intensity of the second measurement signal transmitted from the first antenna and a reception intensity of the second measurement signal transmitted from the second antenna agrees with the information on the transmission intensities included in the first response signal.

Another aspect of the present disclosure is a mobile device. The mobile device includes a receiver configured to receive a signal from the outside, and a transmitter configured to perform signal transmission to the outside. The receiver receives a request signal, and receives first measurement signals twice at different timings. When the receiver has received the request signal and the first measurement signals twice, the transmitter transmits a first response signal that includes information on transmission intensities of a second measurement signals to be transmitted at different timings. The receiver further receives, twice at different timings, the second measurement signals that are transmitted in response to the first response signal having been transmitted from the transmitter. The transmitter further transmits a second response signal under the following condition: a relationship between the reception intensities of the second measurement signals received twice by the receiver agrees with the information on the transmission intensities included in the first response signal.

Yet another aspect of the present disclosure is a wireless communication system for vehicles. The system includes a mobile device, and an on-vehicle device having a first antenna and second antenna. The on-vehicle device transmits a request signal from the first antenna, and transmits first measurement signals at different timings from the first antenna and second antenna. The mobile device, upon receiving the request signal and the first measurement signals from the on-vehicle device, transmits a first response signal to the on-vehicle device. The first response signal includes information on transmission intensities of second measurement signals to be transmitted from the first antenna and second antenna. The on-vehicle device further transmits the second measurement signals to the mobile device at different timings from the first antenna and second antenna. Here, the second measurement signals have transmission intensities that are set on the basis of the information on the transmission intensities included in the received first response signal. The mobile device further transmits a second response signal to the on-vehicle device under the following condition: a relationship between a reception intensity of the second measurement signal received from the first antenna and a reception intensity of the second measurement signal received from the second antenna agrees with the information on the transmission intensities included in the first response signal.

Incidentally, resultants obtained by changing any combination of the above-mentioned components and the expression of the present disclosure in accordance with methods, devices, systems, recording media, and computer programs are also useful as an aspect of the present disclosure.

The present disclosure can reduce the risk of a relay attack for door unlocking.

DETAILED DESCRIPTION OF PREFERRED EMBODIMENTS

Figure 1A:
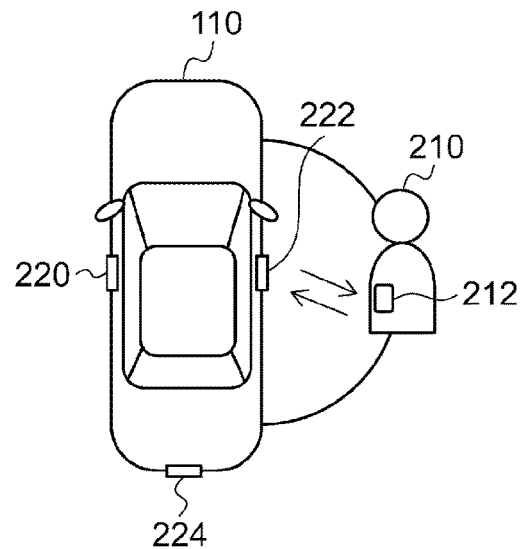
FIG. 1A is a diagram showing the configuration of a wireless communication system for vehicles related to a comparative example different from an exemplary embodiment of the present disclosure.

Prior to the description of the exemplary embodiment of the present disclosure, problems in a conventional key operation free system are described briefly. A signal intensity pattern defined between a vehicle and an electronic key is created by combining signals of a threshold or higher and signals lower than the threshold. Therefore, if the signal intensity pattern and the threshold are completely clarified, the signal intensity pattern is easily the reproduced and a relay attack is easily performed.

Prior to a specific description of the exemplary embodiment of the present disclosure, an outline is described. The exemplary embodiment of the present disclosure relates to a wireless communication system for vehicles that executes communication for unlocking a door of a vehicle between an on-vehicle device mounted on the vehicle and a mobile device (electronic key) carried by a user. As discussed above, the objective of the present exemplary embodiment is to reduce the risk of a relay attack for door unlocking. The on-vehicle device includes a first antenna and second antenna, as the antennas for transmission. For example, the first antenna is disposed on a side portion of the vehicle, and the second antenna is disposed on a rear portion of the vehicle. The on-vehicle device transmits a request signal from the first antenna, and sequentially transmits signals for measurement firstly from the first antenna and then from the second antenna. Hereinafter, the signal for measurement transmitted at this timing is referred to as "first measurement signal".

The mobile device, upon receiving the request signal, wakes up and continuously measures the reception intensity of the first measurement signal received from the first antenna and the reception intensity of the first measurement signal received from the second antenna. The mobile device determines transmission intensities of signals for measurement (hereinafter referred to as "second measurement signals") to be transmitted next by the on-vehicle device. Specifically, the transmission intensity of the second measurement signal to be transmitted from the first antenna, and the transmission intensity of the second measurement signal to be transmitted from the second antenna are determined. The mobile device transmits a response signal including the information of these determined transmission intensities (hereinafter, the response signal transmitted at this timing is referred to as "first response signal").

The on-vehicle device, upon receiving the first response signal, extracts the information on the transmission intensities included in the first response signal, and sequentially transmits the second measurement signals firstly from the first antenna and then from the second antenna with respective transmission intensities corresponding to the information on the transmission intensities. The mobile device continuously measures the reception intensity of the second measurement signal received from the first antenna and the reception intensity of the second measurement signal received from the second antenna. The mobile device estimates the relationship between the reception intensities of the second measurement signals on the basis of the following parameters: a relationship between the reception intensity of the first measurement signal received from the first antenna and the reception intensity of the first measurement signal received from the second antenna, and the information on the transmission intensities included in the first response signal.

The mobile device determines whether the relationship between the reception intensity of the second measurement signal received from the first antenna and the reception intensity of the second measurement signal received from the second antenna agrees with the estimated relationship. When it agrees with the estimated relationship, the mobile device transmits a response signal (hereinafter, the response signal transmitted at this timing is referred to as "second response signal"). The on-vehicle device, upon receiving the second response signal, unlocks the door of the vehicle. The transmission intensity of a second measurement signal to be transmitted by the on-vehicle device is each time designated by the mobile device, so that the risk of clarification of its value becomes low. The above-mentioned determination is executed on the basis of the difference between the following relationships: a relationship between the reception intensities of the first measurement signals from two antennas; and a relationship between the reception intensities of the second measurement signals from two antennas. Therefore, the reproduction becomes difficult and a relay attack is hardly performed. Although a detailed description is omitted in the present exemplary embodiment, the on-vehicle device may be configured to, immediately after the unlocking of a door, automatically open the unlocked door.

Figure 1B:
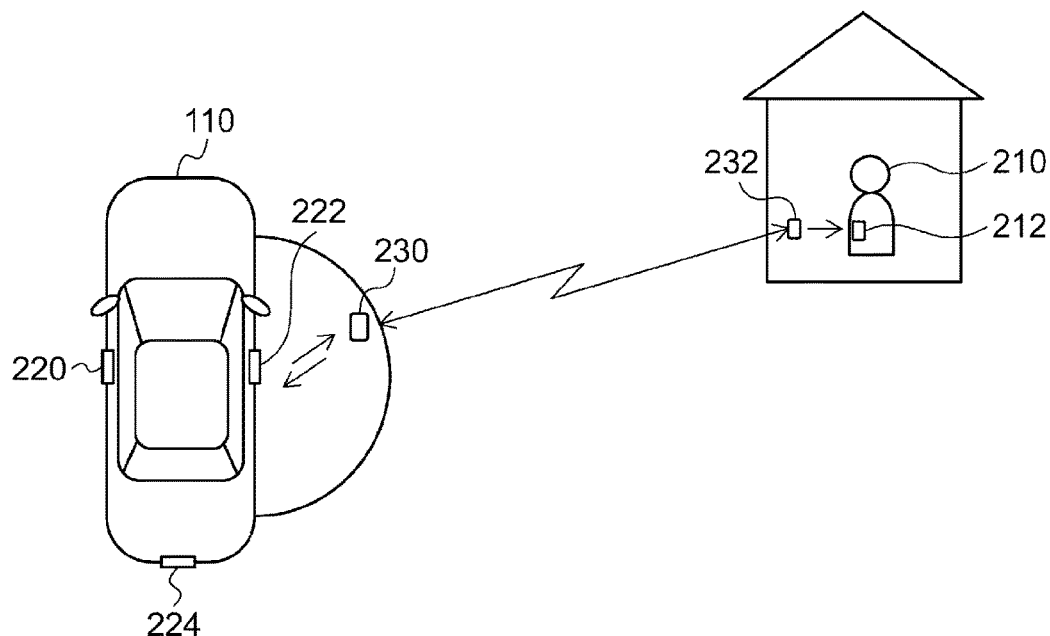
FIG. 1B is a diagram showing an operation when a relay attack is being applied to the wireless communication system for vehicles shown in FIG. 1A.

FIG. 1A and FIG. 1B show wireless communication system 200 for vehicles related to a comparative example different from the exemplary embodiment of the present disclosure. FIG. 1A shows a normal unlocking operation performed in wireless communication system 200 for vehicles. In wireless communication system 200 for vehicles, left side antenna 220, right side antenna 222, and rear antenna 224 are disposed on vehicle 110, and user 210 carries mobile device 212. Left side antenna 220, right side antenna 222, and rear antenna 224 are connected to an on-vehicle device mounted in vehicle 110. Here, an LF signal—for example, a signal of 125 kHz band—is transmitted from left side antenna 220, right side antenna 222, and rear antenna 224, and the LF signal is received by mobile device 212. Mobile device 212 transmits an ultra high frequency (UHF) signal—for example, a signal of 300 MHz band—, and the UHF signal is received by left side antenna 220, right side antenna 222, and rear antenna 224.

Wireless communication system 200 for vehicles corresponds to the above-mentioned key operation free system. The key operation free system is also called a smart entry system, a smart key system, or a passive keyless entry (PKE) system. In this system, mobile device 212 receives an LF signal coming from the on-vehicle device mounted in vehicle 110, and, when the LF signal is determined to be transmitted from a correct on-vehicle device, returns a UHF signal. Thus, mobile device 212 automatically responds to the LF signal, and unlocks the door of vehicle 110. Here, the LF signal and UHF signal are encrypted, and the decryption of data included in them is difficult. Furthermore, the communication distance of the LF signal transmitted from the on-vehicle device is limited to the range of about 2 m from vehicle 110, so that mobile device 212 disposed far away from vehicle 110 does not accidentally respond to the LF signal.

FIG. 1B shows an operation performed when a relay attack is being applied to wireless communication system 200 for vehicles. For a relay attack, first repeater 230 and second repeater 232 are disposed between mobile device 212, and left side antenna 220, right side antenna 222, and rear antenna 224. Here, first repeater 230 and second repeater 232 are placed by a third party other than user 210 who is an owner of vehicle 110. In the relay attack, first repeater 230 and second repeater 232 relay a signal between the on-vehicle device and mobile device 212, and the door of vehicle 110 is unlocked regardless of the will of user 210.

The LF signal having been transmitted from left side antenna 220, right side antenna 222, and rear antenna 224 is received by first repeater 230, and is converted into a UHF signal. The UHF signal coming from first repeater 230 is received by second repeater 232, and is converted into an LF signal. The LF signal coming from second repeater 232 is received by mobile device 212. The communication distance of the LF signal is generally short, so that frequency conversion from the LF signal to a UHF signal having a long communication distance is performed between first repeater 230 and second repeater 232.

Figure 2A:
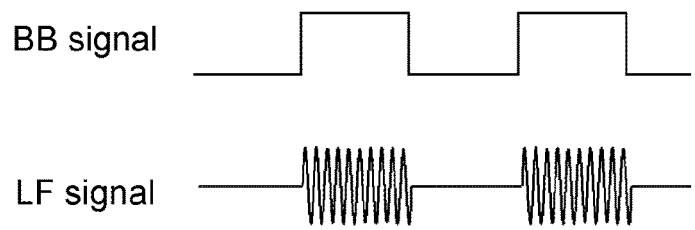
FIG. 2A is a diagram showing signals used in an on-vehicle device of the wireless communication system for vehicles shown in FIG. 1B.
Figure 2B:
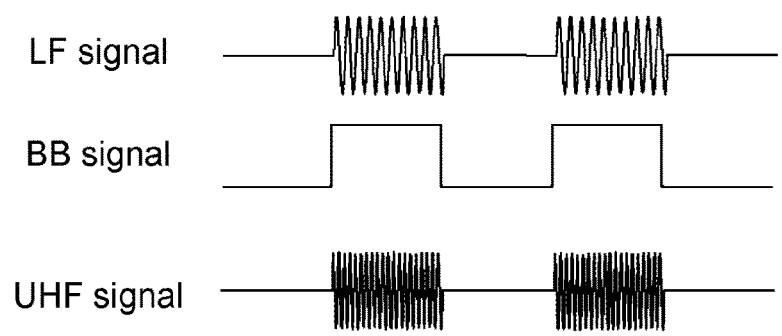
FIG. 2B is a diagram showing signals used in a first repeater of the wireless communication system for vehicles shown in FIG. 1B.
Figure 2C:
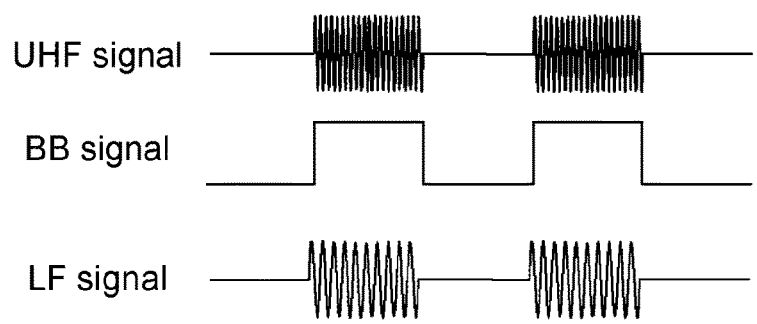
FIG. 2C is a diagram showing signals used in a second repeater of the wireless communication system for vehicles shown in FIG. 1B.
Figure 2D:
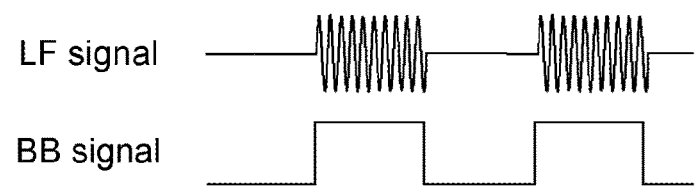
FIG. 2D is a diagram showing signals used in a mobile device of the wireless communication system for vehicles shown in FIG. 1B.

The signals in that case are described in more detail with reference to FIG. 2A to FIG. 2D. FIG. 2A to FIG. 2D show signals used in wireless communication system 200 for vehicles shown in FIG. 1B. Especially, FIG. 2A shows the signals used in the on-vehicle device, FIG. 2B shows the signals used in first repeater 230, FIG. 2C shows the signals used in second repeater 232, and FIG. 2D shows the signals used in mobile device 212. An upper part of FIG. 2A shows a base band signal (BB signal) generated by the on-vehicle device, and a lower part of FIG. 2A shows an LF signal that is generated by modulating the base band signal in the on-vehicle device. The LF signal is transmitted from left side antenna 220, right side antenna 222, and rear antenna 224.

An upper part of FIG. 2B shows the LF signal received by first repeater 230. An intermediate part of FIG. 2B shows the base band signal obtained by demodulating the LF signal in first repeater 230. A lower part of FIG. 2B shows a UHF signal generated by modulating the base band signal in first repeater 230. The UHF signal is transmitted from first repeater 230. An upper part of FIG. 2C shows the UHF signal received by second repeater 232. An intermediate part of FIG. 2C shows the base band signal obtained by demodulating the UHF signal in second repeater 232. A lower part of FIG. 2C shows an LF signal generated by modulating the base band signal in second repeater 232. The LF signal is transmitted from second repeater 232. The upper part of FIG. 2D shows the LF signal received by mobile device 212. A lower part of FIG. 2D shows the base band signal obtained by demodulating the LF signal in mobile device 212. Hereinafter, the description is continued by returning to FIG. 1B.

The UHF signal coming from mobile device 212 may be received by left side antenna 220, right side antenna 222, and rear antenna 224 after being relayed by second repeater 232 and first repeater 230, or may be received by these antennas directly without being relayed. Thus, just by disposing first repeater 230 and second repeater 232 between the on-vehicle device and mobile device 212, the on-vehicle device and mobile device 212 execute the same processing as that in FIG. 1A. Therefore, even when the cipher is not analyzed in first repeater 230 and second repeater 232, vehicle 110 can be unlocked.

Figure 3:
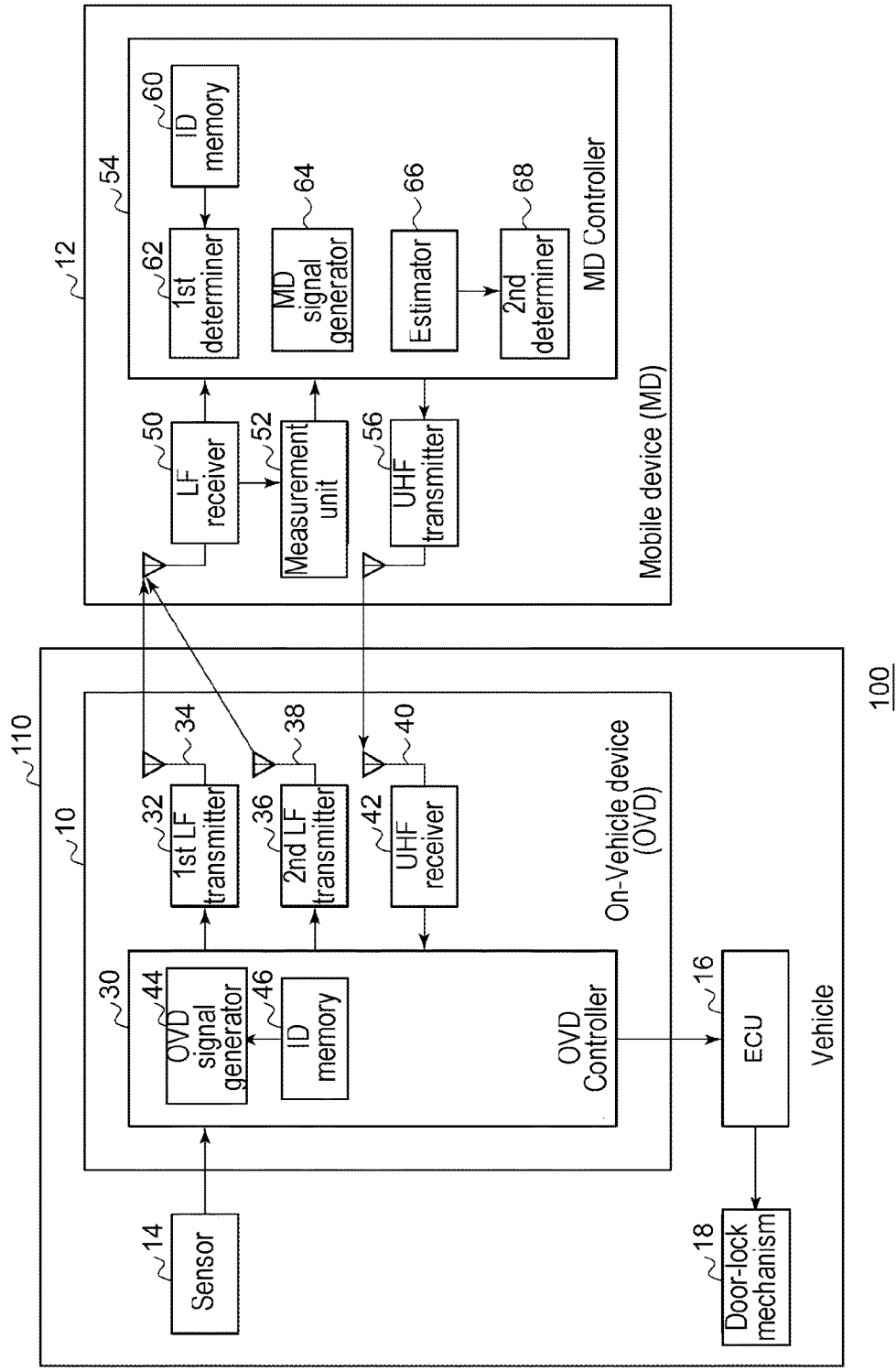
FIG. 3 is a block diagram showing the configuration of a wireless communication system for vehicles in accordance with the exemplary embodiment of the present disclosure.

FIG. 3 shows the configuration of wireless communication system 100 for vehicles in accordance with the exemplary embodiment of the present disclosure. Wireless communication system 100 for vehicles includes vehicle 110 and mobile device 12. Vehicle 110 includes on-vehicle device 10, sensor 14, electronic control unit (ECU) 16, and door lock mechanism 18. On-vehicle device 10 includes on-vehicle device controller 30, first LF transmitter 32, first antenna 34, second LF transmitter 36, second antenna 38, UHF antenna 40, and UHF receiver 42. On-vehicle device controller 30 includes on-vehicle device signal generator 44, and identification (ID) memory 46. First LF transmitter 32 and second LF transmitter 36 constitute a transmitter in on-vehicle device 10. Mobile device 12 includes LF receiver 50, measurement unit 52, mobile device controller 54, and UHF transmitter 56. Mobile device controller 54 includes ID memory 60, first determiner 62, mobile device signal generator 64, estimator 66, and second determiner 68.

Sensor 14 of vehicle 110 is disposed in a doorknob or the like of vehicle 110, and detects a touch by a user. A known technology is used for sensor 14, so that the description thereof is omitted. Upon detecting a touch, sensor 14 notifies on-vehicle device controller 30 of the detection.

Upon receiving the notification from sensor 14, on-vehicle device controller 30 of on-vehicle device 10 commands on-vehicle device signal generator 44 to generate a signal. Upon receiving the command from on-vehicle device controller 30, on-vehicle device signal generator 44 extracts an ID stored in ID memory 46, and generates a request signal including the ID. This ID is identification information used for pair authentication with mobile device 12. When the ID is put into the request signal, the ID may be encrypted. Furthermore, the request signal generated by on-vehicle device signal generator 44 is a base band signal. On-vehicle device signal generator 44 outputs the request signal to first LF transmitter 32.

First LF transmitter 32 receives the request signal from on-vehicle device signal generator 44. First LF transmitter 32, by applying modulation processing to the request signal, generates a request signal of an LF signal (hereinafter, this request signal is also referred to as "request signal"). First LF transmitter 32 transmits the request signal to mobile device 12 from first antenna 34. After transmitting the request signal, first LF transmitter 32 transmits a first measurement signal to mobile device 12 from first antenna 34. The first measurement signal is used for causing mobile device 12 to measure a reception intensity, and is an LF signal. Furthermore, after transmission of the first measurement signal from first antenna 34, second LF transmitter 36 transmits the first measurement signal to mobile device 12 from second antenna 38. At that time, for example, the transmission intensity of the first measurement signal transmitted from second antenna 38 is set equal to that of the first measurement signal transmitted from first antenna 34. Thus, the first measurement signals are transmitted at different timings from first antenna 34 and second antenna 38.

Figure 4:
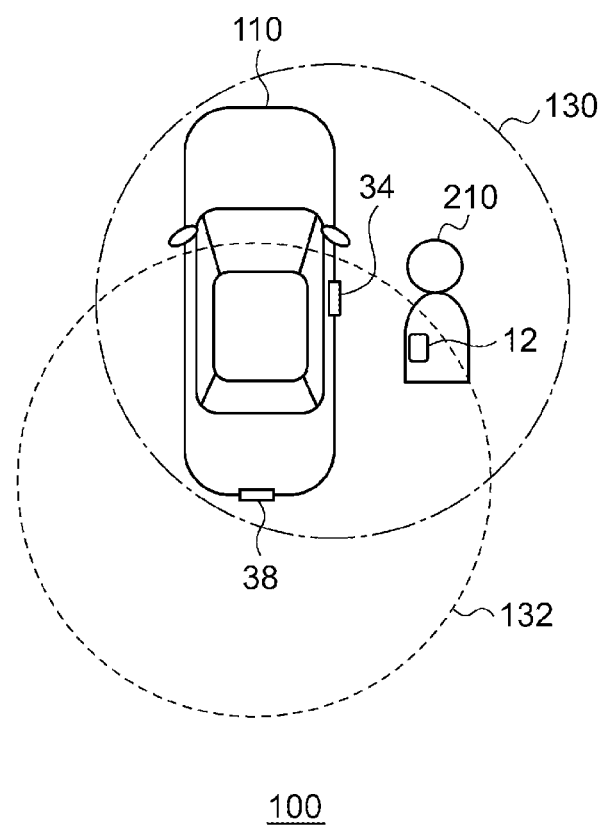
FIG. 4 is a diagram showing the arrangement of a first antenna and a second antenna of the wireless communication system for vehicles shown in FIG. 3.

FIG. 4 shows the arrangement of first antenna 34 and second antenna 38. First antenna 34 is disposed like the arrangement of left side antenna 220 and/or right side antenna 222 in FIG. 1A and FIG. 1B, and second antenna 38 is disposed like the arrangement of rear antenna 224 in FIG. 1A and FIG. 1B. First area 130 shows the receivable range of the LF signal transmitted from first antenna 34, and second area 132 shows the receivable range of the LF signal transmitted from second antenna 38. When user 210 unlocks the door of vehicle 110, the distance between mobile device 12 and first antenna 34 is different from the distance between mobile device 12 and second antenna 38. The direction from mobile device 12 to first antenna 34 is also different from the direction from mobile device 12 to second antenna 38.

Figure 5:
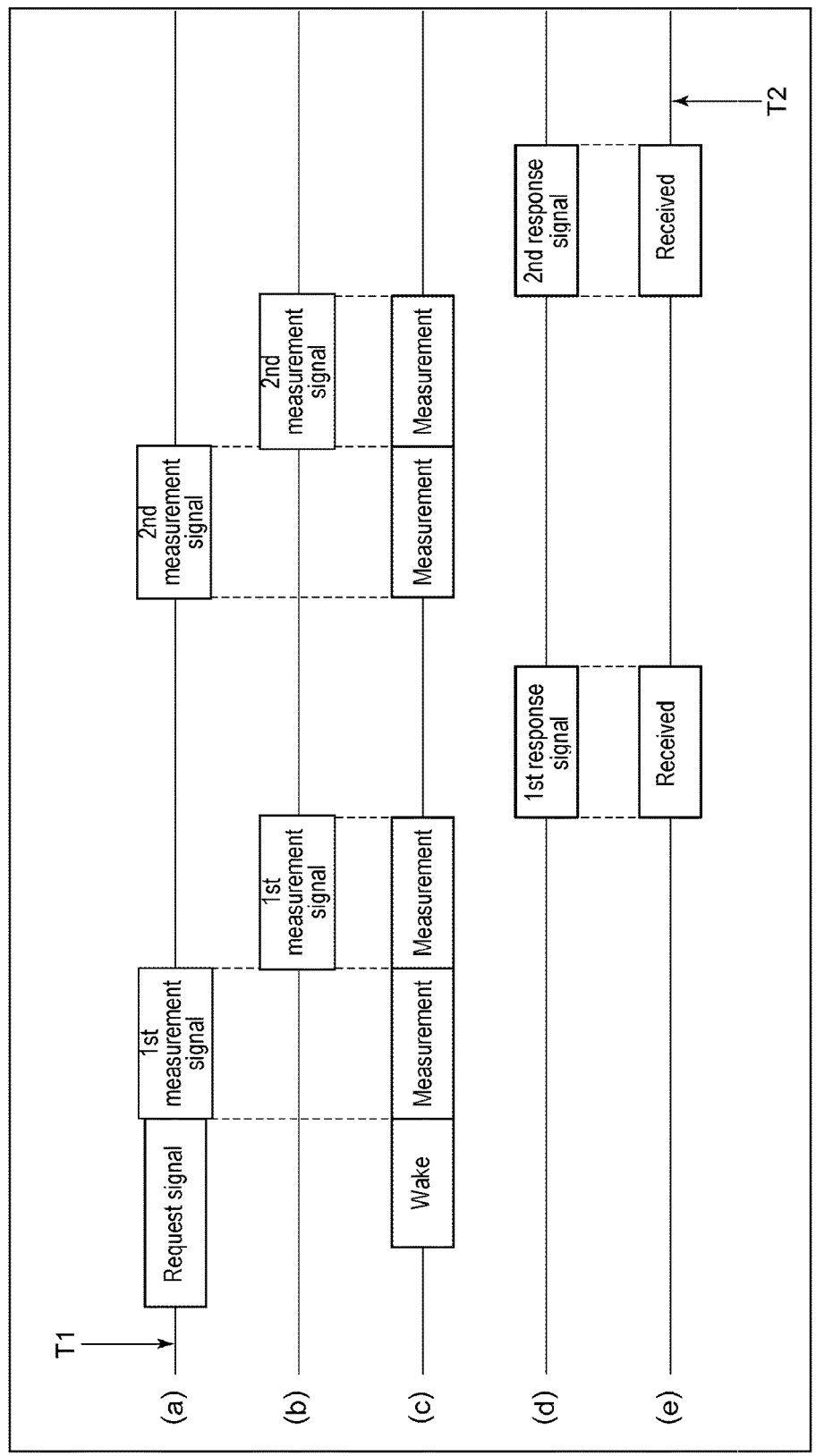
FIG. 5 is a diagram showing signals used in the wireless communication system for vehicles shown in FIG. 3.

FIG. 5 is a diagram showing the signals used in wireless communication system 100 for vehicles. Especially, in (a) of FIG. 5 LF, signals transmitted from first antenna 34 of on-vehicle device 10 is illustrated. Upon receiving a notification from sensor 14 at timing "T1", on-vehicle device 10 continuously transmits a request signal and a first measurement signal from first antenna 34. In (b) of FIG. 5, LF signals transmitted from second antenna 38 of on-vehicle device 10 are illustrated. Immediately after transmitting the first measurement signal from first antenna 34, on-vehicle device 10 transmits the first measurement signal from second antenna 38. The other operations are described later.

Figure 6:
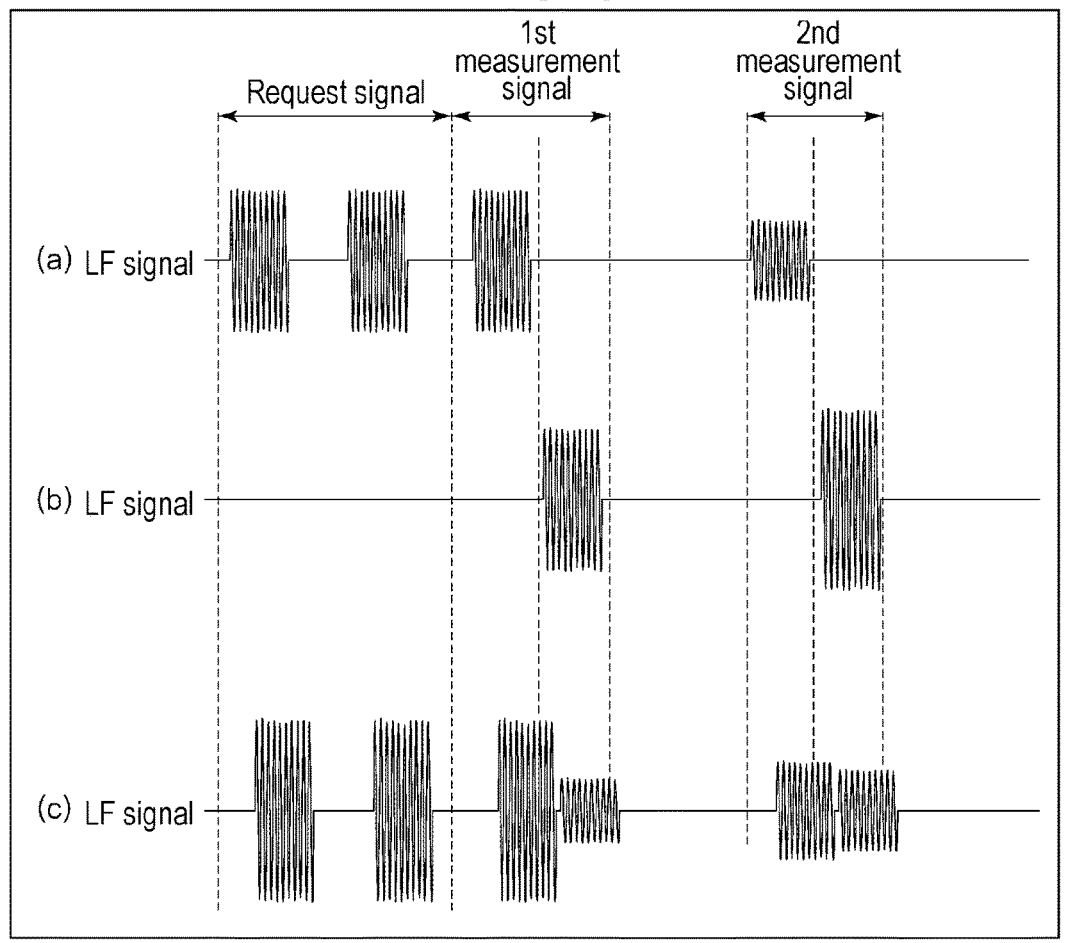
FIG. 6 is another diagram showing the signals used in the wireless communication system for vehicles shown in FIG. 3.

FIG. 6 is another diagram showing the signals used in wireless communication system 100 for vehicles. In (a) of FIG. 6, LF signals transmitted from first antenna 34 of on-vehicle device 10 are illustrated similarly to (a) of FIG. 5. From first antenna 34, the request signal is transmitted and the first measurement signal is subsequently transmitted. In (b) of FIG. 6, LF signals transmitted from second antenna 38 of on-vehicle device 10 are illustrated similarly to (b) of FIG. 5. The first measurement signal is transmitted from second antenna 38 at the same transmission intensity as the transmission intensity of the first measurement signal transmitted from first antenna 34. The other operations are described later, so that the description returns to FIG. 3.

LF receiver 50 of mobile device 12 receives the request signal coming from first antenna 34 of on-vehicle device 10, and receives the first measurement signal from first antenna 34 of on-vehicle device 10, and receives the first measurement signal from second antenna 38 of on-vehicle device 10 at a timing different from that of first antenna 34. LF receiver 50 demodulates the received request signal, and generates a request signal of a base band signal (hereinafter, this request signal is also referred to as "request signal"). LF receiver 50 outputs the request signal to mobile device controller 54. Upon receiving the request signal from LF receiver 50, mobile device controller 54 wakes up mobile device 12.

Figure 7:
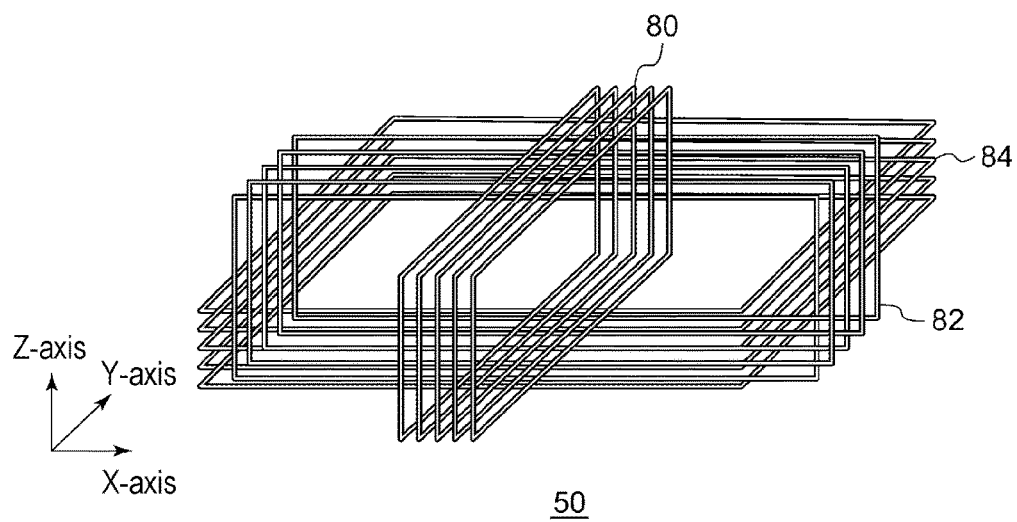
FIG. 7 is a diagram showing the configuration of an antenna connected to an LF receiver of the wireless communication system for vehicles shown in FIG. 3.

Prior to the description of the processing applied to the first measurement signals, an antenna connected to LF receiver 50 is described. This antenna is formed as a multi-dimensional antenna, for example a three-dimensional antenna. FIG. 7 shows the configuration of the antenna connected to LF receiver 50. This antenna has a three-dimensional structure having an X axis, Y axis, and Z axis orthogonal to each other. This antenna includes X antenna 80, Y antenna 82, and Z antenna 84. X antenna 80 receives a signal having a component in the X-axis direction, Y antenna 82 receives a signal having a component in the Y-axis direction, and Z antenna 84 receives a signal having a component in the Z-axis direction. Therefore, the component in the X-axis direction of the first measurement signal is received by X antenna 80, the component in the Y-axis direction thereof is received by Y antenna 82, and the component in the Z-axis direction thereof is received by Z antenna 84. Hereinafter, the description returns to FIG. 3.

Figure 8A:
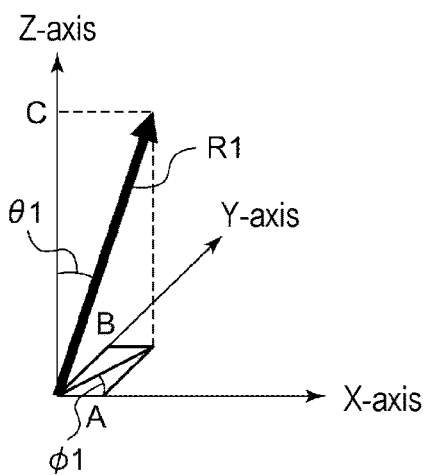
FIG. 8A is a diagram showing a measurement result by a measurement unit of the wireless communication system for vehicles shown in FIG. 3.

LF receiver 50 sequentially outputs, to measurement unit 52, the first measurement signal received from first antenna 34 and the first measurement signal received from second antenna 38. Measurement unit 52 measures the reception intensity of the first measurement signal coming from first antenna 34, for example, measures a received signal strength indicator (RSSI). FIG. 8A to FIG. 8D show the measurement results by measurement unit 52. FIG. 8A shows reception intensity "R1" for the first measurement signal coming from first antenna 34. In this description, the component in the X-axis direction received by X antenna 80 is shown by "A", the component in the Y-axis direction received by Y antenna 82 is shown by "B", and the component in the Z-axis direction received by Z antenna 84 is shown by "C". Therefore, reception intensity "R1" for the first measurement signal coming from first antenna 34 is shown by the vector sum of "A+B+C".

Figure 8C:
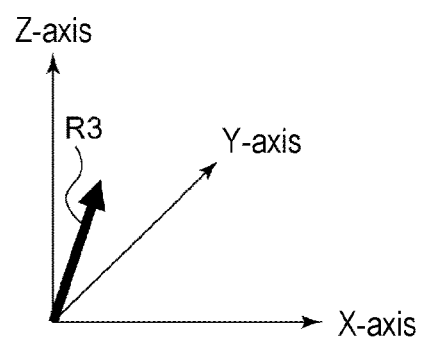
FIG. 8C is a diagram showing yet another measurement result by the measurement unit of the wireless communication system for vehicles shown in FIG. 3.
Figure 8B:
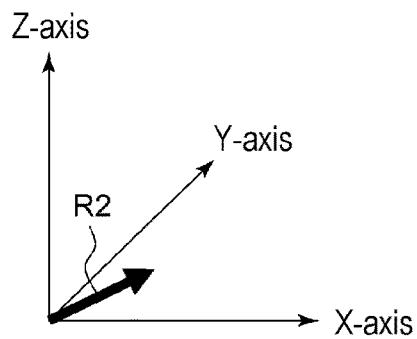
FIG. 8B is a diagram showing another measurement result by the measurement unit of the wireless communication system for vehicles shown in FIG. 3.

Measurement unit 52 also measures the reception intensity of the first measurement signal coming from second antenna 38, similarly to the reception intensity of the first measurement signal coming from first antenna 34. FIG. 8B shows reception intensity "R2" for the first measurement signal coming from second antenna 38. FIG. 8B is illustrated in a form similar to that of FIG. 8A. Hereinafter, the description returns to FIG. 3. Measurement unit 52 outputs, to mobile device controller 54, the measured reception intensity of the first measurement signal coming from first antenna 34 and the measured reception intensity of the first measurement signal coming from second antenna 38. Mobile device controller 54 stores the reception intensity of the first measurement signal coming from first antenna 34 and the reception intensity of the first measurement signal coming from second antenna 38.

In (c) of FIG. 5, the processing applied to the LF signals received by LF receiver 50 of mobile device 12 is illustrated. Wake-up is performed in response to the request signal, the first measurement signal coming from first antenna 34 is measured, and the first measurement signal coming from second antenna 38 is measured. In (c) of FIG. 6, LF signals received by LF receiver 50 of mobile device 12 are illustrated. As discussed above, the first measurement signal coming from first antenna 34 and the first measurement signal coming from second antenna 38 are transmitted with the same transmission intensity. On the other hand, as shown in FIG. 4, the distance from first antenna 34 to mobile device 12 is shorter than that from second antenna 38 to mobile device 12. Therefore, the reception intensity of the first measurement signal coming from first antenna 34 is higher than that of the first measurement signal coming from second antenna 38. Hereinafter, the description returns to FIG. 3.

In mobile device controller 54, first determiner 62 extracts an ID included in the request signal. First determiner 62 also obtains an ID stored in ID memory 60. Furthermore, first determiner 62 executes pair authentication on the basis of the extracted ID and the obtained ID. A known technology is used for the pair authentication, so that the description thereof is omitted. When the pair authentication fails, the processing described later is not executed. When the pair authentication is successful, the processing described later is executed.

Mobile device signal generator 64 generates a first response signal that includes information on the transmission intensities of a second measurement signals to be transmitted from first antenna 34 and second antenna 38 (hereinafter, this information is referred to as "transmission intensity information"). Specifically, mobile device signal generator 64 determines the transmission intensity used when the second measurement signal is transmitted from first antenna 34 and the transmission intensity used when the second measurement signal is transmitted from second antenna 38 so as to satisfy the following condition: the ratio between the transmission intensity from first antenna 34 and the transmission intensity from second antenna 38 differs between the first measurement signals and the second measurement signals.

As discussed above, the transmission intensity used when the first measurement signal is transmitted from first antenna 34 is equal to the transmission intensity used when the first measurement signal is transmitted from second antenna 38, so that the ratio between them is "1". Therefore, mobile device signal generator 64 determines the transmission intensity used when the second measurement signal is transmitted from first antenna 34 and the transmission intensity used when the second measurement signal is transmitted from second antenna 38 so that the ratio between the transmission intensities of the second measurement signals is other than "1".

For example, mobile device signal generator 64 determines a transmission intensity used when the second measurement signal is transmitted from first antenna 34 so that this transmission intensity is "50%" of the transmission intensity used when the first measurement signal is transmitted from first antenna 34. Furthermore, mobile device signal generator 64 determines a transmission intensity used when the second measurement signal is transmitted from second antenna 38 so that this transmission intensity is "120%" of the transmission intensity used when the first measurement signal is transmitted from second antenna 38. In this case, the transmission intensity information is expressed by "50%, 120%".

Incidentally, the transmission intensity information does not need to be a relative value to the transmission intensity of the first measurement signal, but may be an absolute value. Furthermore, in the case that the transmission intensity of the first measurement signal transmitted from first antenna 34 and the transmission intensity of the second measurement signal transmitted from first antenna 34 are fixed values, the transmission intensity information may indicate, as the ratio to the fixed values, the transmission intensity used when the second measurement signal is transmitted from second antenna 38. When the transmission intensity information is put into the first response signal, the transmission intensity information may be encrypted. The first response signal generated by mobile device signal generator 64 is a base band signal. Mobile device signal generator 64 outputs the first response signal to UHF transmitter 56.

UHF transmitter 56 receives the first response signal from mobile device signal generator 64. UHF transmitter 56, by modulating the first response signal, generates a first response signal of a UHF signal (hereinafter, this response signal is also referred to as "first response signal"). UHF transmitter 56 transmits the first response signal to on-vehicle device 10 from an antenna. In (d) of FIG. 5, the UHF signals transmitted from UHF transmitter 56 of mobile device 12 are illustrated. After the reception of the first measurement signal, mobile device 12 transmits the first response signal. Hereinafter, the description returns to FIG. 3.

UHF receiver 42 of on-vehicle device 10 receives the first response signal from mobile device 12 via UHF antenna 40. UHF receiver 42, by demodulating the received first response signal, generates a first response signal of a base band signal (hereinafter, this response signal is also referred to as "first response signal"). UHF receiver 42 outputs the first response signal to on-vehicle device controller 30. In (e) of FIG. 5, the processing applied to the UHF signals received by UHF receiver 42 of on-vehicle device 10 is illustrated. As shown in the drawing, the first response signal is received. Hereinafter, the description returns to FIG. 3.

On-vehicle device controller 30 receives the first response signal from UHF receiver 42. On-vehicle device controller 30 extracts the transmission intensity information included in the first response signal. As discussed above, the transmission intensity information indicates: the transmission intensity used when a second measurement signal is transmitted from first antenna 34; and the transmission intensity used when a second measurement signal is transmitted from second antenna 38. On-vehicle device controller 30 sets, in first LF transmitter 32, the transmission intensity used when the second measurement signal is transmitted from first antenna 34. On-vehicle device controller 30 also sets, in second LF transmitter 36, the transmission intensity used when the second measurement signal is transmitted from second antenna 38.

First LF transmitter 32 transmits the second measurement signal to mobile device 12 from first antenna 34 at the transmission intensity set by on-vehicle device controller 30. Furthermore, second LF transmitter 36 transmits the second measurement signal to mobile device 12 from second antenna 38 at the transmission intensity set by on-vehicle device controller 30. In other words, the second measurement signals are transmitted at different timings from first antenna 34 and second antenna 38, respectively.

In (a) of FIG. 5, in response to the first response signal, the second measurement signal is transmitted from first antenna 34. In (b) of FIG. 5, after the second measurement signal is transmitted from first antenna 34, the second measurement signal is transmitted from second antenna 38. In (a) of FIG. 6, the second measurement signal set at 50% of the transmission intensity of the first measurement signal is illustrated. In (b) of FIG. 6, the second measurement signal set at 120% of the transmission intensity of the first measurement signal is illustrated. Hereinafter, the description returns to FIG. 3.

Figure 8D:
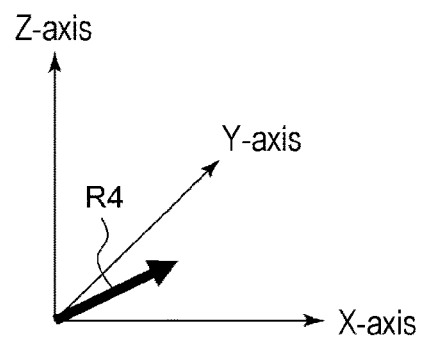
FIG. 8D is a diagram showing still another measurement result by the measurement unit of the wireless communication system for vehicles shown in FIG. 3.

LF receiver 50 of mobile device 12 receives the second measurement signals coming from first antenna 34 and second antenna 38 of on-vehicle device 10 at different timings LF receiver 50 sequentially outputs, to measurement unit 52, the second measurement signal received from first antenna 34 and the second measurement signal received from second antenna 38. Measurement unit 52 measures the reception intensity of the second measurement signal received from first antenna 34 similarly to the above-mentioned method, and measures the reception intensity of the second measurement signal received from second antenna 38 similarly to the above-mentioned method. FIG. 8C shows reception intensity "R3" for the second measurement signal coming from first antenna 34. FIG. 8D shows reception intensity "R4" for the second measurement signal coming from second antenna 38. These intensities are shown similarly to FIG. 8A. Hereinafter, the description returns to FIG. 3. Measurement unit 52 outputs, to mobile device controller 54, the measured reception intensity of the second measurement signal coming from first antenna 34 and the measured reception intensity of the second measurement signal coming from second antenna 38.

In (c) of FIG. 5, the second measurement signal coining from first antenna 34 is measured, and the second measurement signal coming from second antenna 38 is measured. In (c) of FIG. 6, the second measurement signal coming from first antenna 34 and the second measurement signal coming from second antenna 38 are received. Hereinafter, the description returns to FIG. 3.

Second determiner 68 receives the values in the transmission intensity information generated by mobile device signal generator 64. In other words, these values are the value of the transmission intensity used when the second measurement signal is transmitted from first antenna 34, and the value of the transmission intensity used when the second measurement signal is transmitted from second antenna 38. In the above-mentioned example, the information indicates "50%, 120%". Second determiner 68 multiplies the reception intensity of the first measurement signal coming from first antenna 34 by the value of the transmission intensity used when the second measurement signal is transmitted from first antenna 34, for example "50%". The multiplication result is an estimated value of the reception intensity of the second measurement signal coming from first antenna 34.

Furthermore, second determiner 68 multiplies the reception intensity of the first measurement signal coming from second antenna 38 by the value of the transmission intensity used when the second measurement signal is transmitted from second antenna 38, for example "120%". The multiplication result is an estimated value of the reception intensity of the second measurement signal coming from second antenna 38. Furthermore, by dividing the latter multiplication result by the former multiplication result, second determiner 68 obtains the relationship (hereinafter referred to as "first relationship") between the following estimated values:

the estimated value of the reception intensity of the second measurement signal coming from first antenna 34; and the estimated value of the reception intensity of the second measurement signal coming from second antenna 38.

Furthermore, by dividing the reception intensity of the second measurement signal coming from second antenna 38 by the reception intensity of the second measurement signal coming from first antenna 34, second determiner 68 obtains the relationship (hereinafter referred to as "second relationship") between the following reception intensities:

the reception intensity of the second measurement signal coining from first antenna 34; and the reception intensity of the second measurement signal coming from second antenna 38.

In second determiner 68, when the difference between the first relationship and the second relationship is equal to or larger than a threshold, the processing described later is not executed. When the difference is smaller than the threshold, the processing described later is executed.

Estimator 66 receives, from measurement unit 52, the component in each axis direction of the first measurement signal coming from first antenna 34. The component in each axis direction is shown in FIG. 8A. Estimator 66 calculates angle θ1 formed between vector R1 and the Z axis on the basis of the components in the axis directions. Furthermore, estimator 66 calculates the mapping of vector R1 with respect to the X-Y plane, and also calculates angle φ1 formed between the mapping and the X axis. A known vector technology is used for the calculation of angle θ1 and angle φ1, so that the description thereof is omitted. Furthermore, estimator 66 receives, from measurement unit 52, the component in each axis direction of the first measurement signal from second antenna 38. Estimator 66 calculates angle θ2 and angle φ2 of vector R2 similarly to the above-mentioned processing. The calculation of angle θ1, angle φ1, angle θ2, and angle φ2 corresponds to the estimation of the transmission direction of the first measurement signal. Estimator 66 outputs angle θ1, angle φ1, angle θ2, and angle φ2 to second determiner 68.

Furthermore, estimator 66 receives the component in each axis direction of the second measurement signal coming from first antenna 34, and executes similar processing to calculate angle θ3 and angle φ3 of vector R3. Furthermore, estimator 66 receives the component in each axis direction of the second measurement signal coming from second antenna 38, and executes similar processing to calculate angle θ4 and angle φ4 of vector R4. The calculation of angle θ3, angle φ3, angle θ4, and angle φ4 corresponds to the estimation of the transmission direction of the second measurement signal. Thus, estimator 66 estimates the transmission direction of the first measurement signal and the transmission direction of the second measurement signal, on the basis of the reception intensity of each dimension of a multi-dimensional antenna. Estimator 66 outputs angle θ3, angle φ3, angle θ4, and angle φ4 to second determiner 68.

Second determiner 68 calculates the difference between angle θ1 and angle θ3, the difference between angle φ1 and angle φ3, the difference between angle θ2 and angle θ4, and the difference between angle φ2 and angle φ4. Second determiner 68 holds thresholds corresponding to these angles. When at least one of all differences is equal to or larger than the corresponding threshold, the processing described later is not executed. When the all differences are less than the respective thresholds, the processing described later is executed. Such a state is also called as the case that the difference between the estimated transmission direction of the first measurement signal and the estimated transmission direction of the second measurement signal is smaller than a threshold. In this case, mobile device signal generator 64 generates a second response signal. Mobile device signal generator 64 outputs the second response signal to UHF transmitter 56.

UHF transmitter 56 receives the second response signal from mobile device signal generator 64. UHF transmitter 56, by modulating the second response signal, generates a second response signal of a UHF signal (hereinafter, this response signal is also referred to as "second response signal"). UHF transmitter 56 transmits the second response signal to on-vehicle device 10 from an antenna. In (d) of FIG. 5, after the reception of the second measurement signal, mobile device 12 transmits the second response signal. Hereinafter, the description returns to FIG. 3.

UHF receiver 42 of on-vehicle device 10 receives the second response signal from mobile device 12. UHF receiver 42, by demodulating the received second response signal, generates a second response signal of a base band signal (hereinafter, this response signal is also referred to as "second response signal"). UHF receiver 42 outputs the second response signal to on-vehicle device controller 30. In (e) of FIG. 5, on-vehicle device controller 30 receives the second response signal. Hereinafter, the description returns to FIG. 3.

On-vehicle device controller 30 receives the second response signal from UHF receiver 42. Upon receiving the second response signal, on-vehicle device controller 30 commands ECU 16 of vehicle 110 to unlock door lock mechanism 18. A known technology is used for ECU 16 and door lock mechanism 18, so that the description thereof is omitted.

This configuration can be achieved by a hardware configuration including a CPU (central processing unit), a memory, and the other LSI (large scale integration) of any computer, and by a software configuration including programs loaded in the memory. This drawing shows function blocks achieved by a combination of them. Therefore, persons skilled in the art understand that these function blocks are achieved in various forms including only hardware or a combination of hardware and software.

Figure 9:
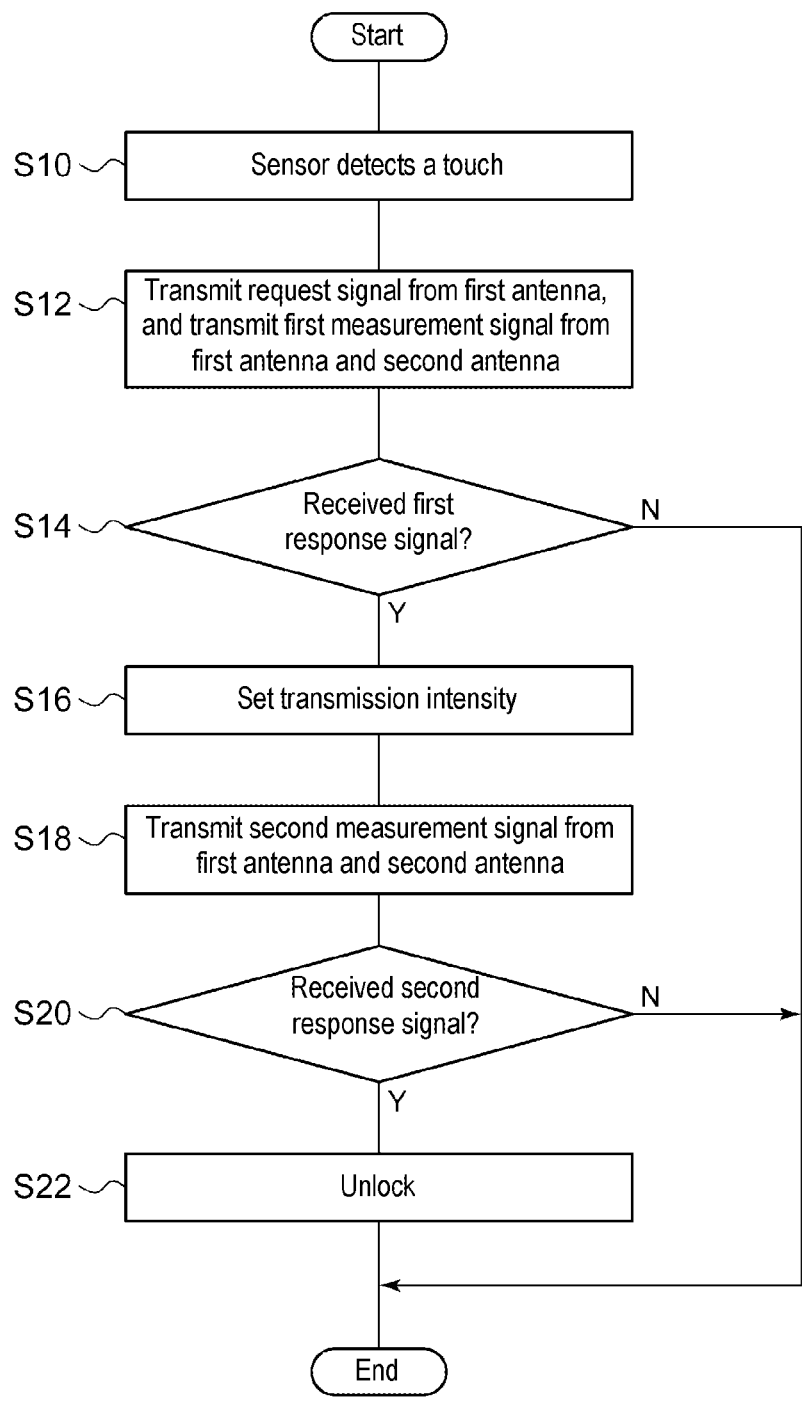
FIG. 9 is a flowchart showing a communication procedure by an on-vehicle device of the wireless communication system for vehicles shown in FIG. 3.

An operation of wireless communication system 100 for vehicles having the above-mentioned configuration is described. FIG. 9 is a flowchart showing a communication procedure by on-vehicle device 10. Sensor 14 detects a touch (S10). A request signal is transmitted from first antenna 34, and first measurement signals are transmitted from first antenna 34 and second antenna 38 (S12). When UHF receiver 42 has received a first response signal (Y in S14), on-vehicle device controller 30 sets the transmission intensities to first LF transmitter 32 and second LF transmitter 36 (S16), and second measurement signals are transmitted from first antenna 34 and second antenna 38 (S18). When UHF receiver 42 has received a second response signal (Y in S20), ECU 16 unlocks door lock mechanism 18 (S22). When UHF receiver 42 has not received a first response signal (N in S14) or when UHF receiver 42 has not received a second response signal (N in S20), the processing is completed.

Figure 10:
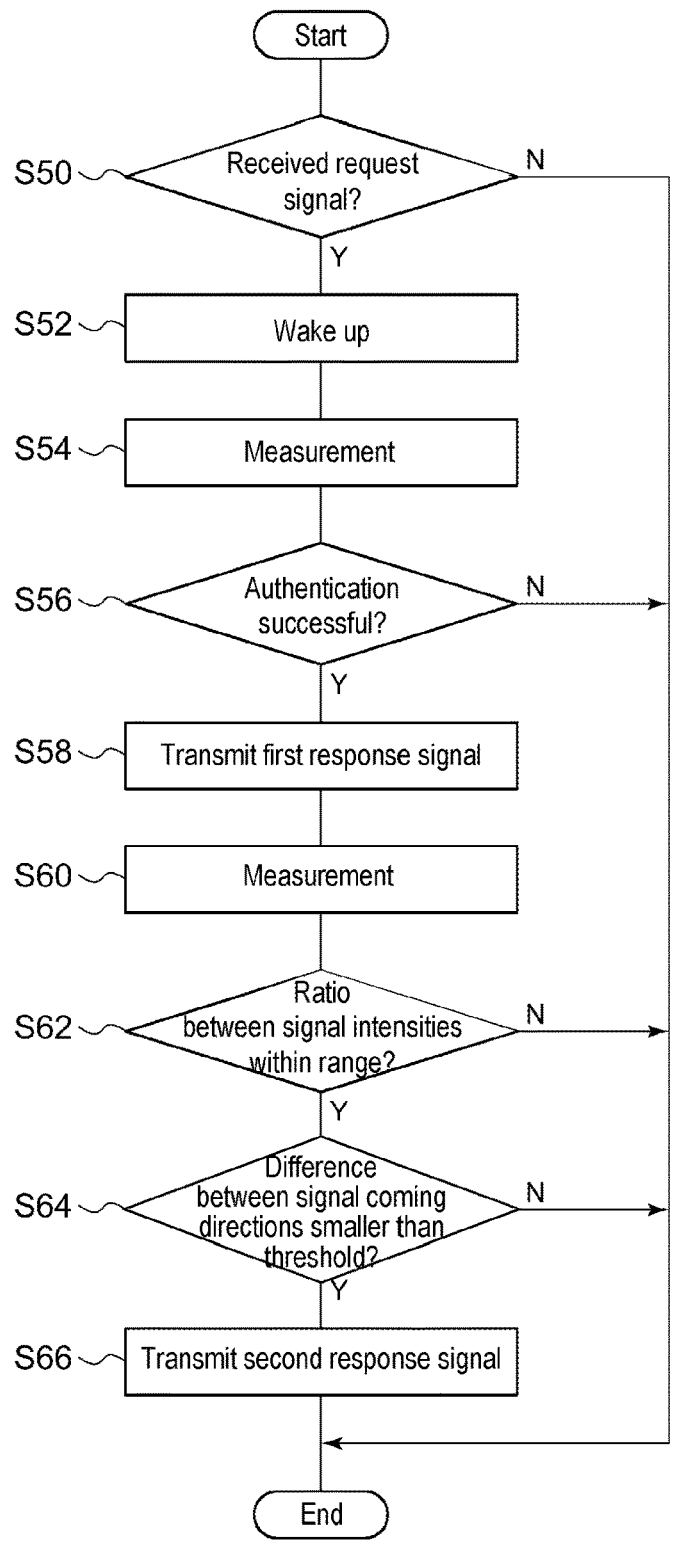
FIG. 10 is a flowchart showing a communication procedure by a mobile device of the wireless communication system for vehicles shown in FIG. 3.

FIG. 10 is a flowchart showing a communication procedure by mobile device 12. When LF receiver 50 has received a request signal (Y in S50), mobile device controller 54 wakes up (S52). Measurement unit 52 measures the reception intensity of a first measurement signal coming from first antenna 34 and the reception intensity of a first measurement signal coming from second antenna 38 (S54). When authentication is successful in first determiner 62 (Y in S56), UHF transmitter 56 transmits a first response signal including the transmission intensities (S58). Measurement unit 52 measures the reception intensity of a second measurement signal coming from first antenna 34 and the reception intensity of a second measurement signal coming from second antenna 38 (S60). When the ratio between the signal intensities is within a range (Y in S62) and the difference between the signal coming directions is smaller than a threshold (Y in S64), UHF transmitter 56 transmits a second response signal (S66). The processing is completed when one of the following cases is established:

LF receiver 50 has not received a request signal (N in S50);

authentication is not successful (N in S56);

the ratio between the signal intensities is not within the range (N in S62); and the difference between the signal coming directions is not smaller than the threshold (N in S64).

In the exemplary embodiment of the present disclosure, the second response signal is received under the following condition:

the relationship between the reception intensities of the second measurement signals from first antenna 34 and second antenna 38 agrees with the transmission intensity information included in the first response signal. Therefore, the determination can be performed in accordance with the information of the reception intensity and the other information. The determination in accordance with the information of the reception intensity and the other information can suppress reproduction. Suppressing the reproduction can reduce the risk of a relay attack. Furthermore, the ratio between the transmission intensity from the first antenna and the transmission intensity from the second antenna differs between the first measurement signals and the second measurement signals, so that the reproduction can be suppressed.

Furthermore, the second response signal is transmitted when the relationship between the reception intensities of the second measurement signals from first antenna 34 and second antenna 38 agrees with the transmission intensity information included in the first response signal. Therefore, the risk of a relay attack can be reduced. The second response signal is transmitted when the difference between the transmission directions of the first measurement signal and the transmission direction of the second measurement signals is smaller than a threshold. Therefore, the safety can be further improved. Furthermore, relay of signals coming from a plurality of antennas takes time and effort, so that the risk of a relay attack can be reduced.

As discussed above, on-vehicle device 10 of the present exemplary embodiment includes first antenna 34, second antenna 38, first LF transmitter 32 and second LF transmitter 36 as a transmitter, and UHF receiver 42 as a receiver. The transmitter is connected to first antenna 34 and second antenna 38, and performs signal transmission to the outside from first antenna 34 and second antenna 38. The receiver receives signals from the outside. The transmitter transmits a request signal from the first antenna, and transmits first measurement signals at different timings from first antenna 34 and second antenna 38. The receiver receives a first response signal that includes information on the transmission intensities of second measurement signals to be transmitted by the transmitter from first antenna 34 and second antenna 38. The first response signal is transmitted in response to the request signal and the first response signals that have been transmitted by the transmitter. The transmitter further transmits, at different timings from first antenna 34 and second antenna 38, second measurement signals having transmission intensities that are set on the basis of the information on the transmission intensities included in the first response signal. The receiver receives a second response signal. The second response signal is transmitted under the following condition: a relationship between the reception intensity of the second measurement signal transmitted from first antenna 34 and the reception intensity of the second measurement signal transmitted from second antenna 38 agrees with the information on the transmission intensities included in the first response signal.

In this configuration, the receiver receives the second response signal under the following condition: a relationship between the reception intensities of the second measurement signals from first antenna 34 and second antenna 38 agrees with the information on the transmission intensities included in the first response signal. Therefore, the risk of a relay attack can be reduced.

The information on the transmission intensities included in the first response signal received by the receiver may indicate the transmission intensity from first antenna 34 and the transmission intensity from second antenna 38 used when the second measurement signals are transmitted so as to satisfy the following condition: the ratio between the transmission intensity in the transmission from first antenna 34 and the transmission intensity in the transmission from second antenna 38 differs between the first measurement signals and the second measurement signals. In this case, the ratio differs between the first measurement signals and the second measurement signals, so that the reproduction of the second response signal can be suppressed.

Mobile device 12 of the present exemplary embodiment includes: LF receiver 50 as a receiver configured to receive a signal from the outside; and UHF transmitter 56 as a transmitter configured to perform signal transmission to the outside. The receiver receives a request signal coming from external first antenna 34 of on-vehicle device 10, and receives first measurement signals at different timings from first antenna 34 and second antenna 38 of on-vehicle device 10. In other words, the receiver receives a request signal, and receives two first measurement signals at different timings. When the receiver has received the request signal and the two first measurement signals, the transmitter transmits, to on-vehicle device 10, a first response signal that includes information on the transmission intensities of second measurement signals to be transmitted from first antenna 34 and second antenna 38. In other words, when the receiver has received the request signal and the two first measurement signals, the transmitter transmits the first response signal that includes information on the transmission intensities used when the second measurement signals are transmitted at different timings. In response to the first response signal transmitted by the transmitter, the receiver receives second measurement signals at different timings from first antenna 34 and second antenna 38 of on-vehicle device 10. In other words, the receiver receives, at different timings, two second measurement signals transmitted in response to the first response signal having been transmitted by the transmitter. The transmitter transmits a second response signal to on-vehicle device 10 under the following condition: a relationship between the reception intensity of the second measurement signal coming from first antenna 34 and the reception intensity of the second measurement signal coming from second antenna 38 agrees with the information on the transmission intensities included in the first response signal. Here, these second measurement signals received by the receiver. In other words, when the relationship between the reception intensities of the two second measurement signals received by the receiver agrees with the information on the transmission intensities included in the first response signal, the transmitter transmits the second response signal.

In this configuration, when the relationship between the reception intensities of the second measurement signals from first antenna 34 and second antenna 38 agrees with the information on the transmission intensities included in the first response signal, the transmitter transmits the second response signal. Therefore, the risk of a relay attack can be reduced.

The information on the transmission intensities included in the first response signal transmitted by the transmitter may indicate the transmission intensity from the first antenna and the transmission intensity from the second antenna used when the second measurement signals are transmitted so as to satisfy the following condition: the ratio between the transmission intensity from the first antenna and the transmission intensity from the second antenna differs between the first measurement signals and the second measurement signals. In this case, the ratio differs between the first measurement signals and the second measurement signals, so that the reproduction of the second response signal can be suppressed.

Mobile device 12 may further include a multi-dimensional antenna and estimator 66. Estimator 66 estimates a transmission direction of the first measurement signal and a transmission direction of the second measurement signal, on the basis of the reception intensity of each dimension of the multi-dimensional antenna. The transmission condition of the second response signal by the transmitter may include the following condition: a difference between the transmission direction of the first measurement signal and the transmission direction of the second measurement signal is smaller than a threshold. These transmission directions are estimated by the estimator. In this case, when the difference between the transmission direction of the first measurement signal and the transmission direction of the second measurement signal is smaller than the threshold, a second response signal is transmitted. Therefore, the safety can be further improved.

Wireless communication system 100 for vehicles includes on-vehicle device 10 and mobile device 12. On-vehicle device 10 includes first antenna 34 and second antenna 38, transmits a request signal from first antenna 34, and transmits first measurement signals at different timings from first antenna 34 and second antenna 38. Mobile device 12, upon receiving the request signal and the first measurement signals from on-vehicle device 10, transmits a first response signal to on-vehicle device 10. The first response signal includes information on the transmission intensities of second measurement signals to be transmitted from first antenna 34 and second antenna 38. On-vehicle device 10 further transmits the second measurement signals to mobile device 12 at different timings from first antenna 34 and second antenna 38. Here, the transmission intensities of the second measurement signals are set on the basis of the information on the transmission intensities included in the received first response signal. Mobile device 12 further transmits a second response signal to on-vehicle device 10 under the following condition: a relationship between the reception intensity of the second measurement signal received from first antenna 34 and the reception intensity of the second measurement signal received from second antenna 38 agrees with the information on the transmission intensities included in the first response signal.

In this configuration, when the relationship between the reception intensities of the second measurement signals from first antenna 34 and second antenna 38 agrees with the information on the transmission intensities included in the first response signal, mobile device 12 transmits the second response signal. Therefore, the risk of a relay attack can be reduced.

Thus, the present disclosure has been described on the basis of the exemplary embodiment. Persons skilled in the art understand that this exemplary embodiment is an example, these components or a combination of processes can be used as various modified examples, and such modified examples are also within the scope of the present disclosure.

In the present exemplary embodiment, UHF transmitter 56 and UHF receiver 42 use UHF signals. However, the present disclosure is not limited to this. For example, signals that are other than UHF signals and have a frequency higher than LF may be used. The present modified example can increase the degree of freedom in configuration.

In the present exemplary embodiment, estimator 66 estimates the transmission direction of the first measurement signal and the transmission direction of the second measurement signal. Second determiner 68 adds the condition that the estimated transmission directions are close to each other, to the condition for transmitting the second response signal. However, the present disclosure is not limited to this. For example, the configuration may be employed in which estimator 66 is not provided and second determiner 68 does not use the estimated transmission direction as the condition. In this case, on the basis of the difference between the first relationship and the second relationship, second determiner 68 determines whether or not to transmit a second response signal. The present modified example can make the processing easy.

In the present exemplary embodiment, wireless communication system 100 for vehicles is described as measures against a relay attack for unlocking a door. However, the present disclosure is not limited to this. For example, wireless communication system 100 for vehicles as measures against a relay attack may be applied to an engine start operation of a vehicle in a keyless entry system. The present modified example can reduce the risk of a relay attack at an engine start of a vehicle.

An on-vehicle device, a mobile device, and a wireless communication system for vehicles including them in the present disclosure are useful for a keyless entry system used for unlocking a door or starting an engine.

What is claimed is:

1. A wireless communication system for a vehicle comprising:
   an on-vehicle device configured to be coupled to a first antenna and a second antenna, the first and second antennas being located in the vehicle; and
   a mobile device comprising a multi-dimensional antenna, wherein:
   the on-vehicle device, in operation:
      transmits a request signal and a first measurement signal from the first antenna, and
      transmits a second measurement signal from the second antenna,
   the mobile device, in operation:
      receives the request signal, the first measurement signal, and the second measurement signal with the multi-dimensional antenna from the on-vehicle device, and
      after receiving the request signal, the first measurement signal, and the second measurement signal, measures a first reception intensity of the first measurement signal and a second reception intensity of the second measurement signal, and transmits a first response signal to the on-vehicle device, and,
   the on-vehicle device, in operation:
      receives the first response signal, and
      after receiving the first response signal, transmits a third measurement signal from the first antenna and a fourth measurement signal from the second antenna, the third measurement signal and the fourth measurement signal being transmitted at different timings,
   and
   the mobile device, in operation:
      receives the third measurement signal and the fourth measurement signal with the multi-dimensional antenna at different timings from the on-vehicle device,
      measures a third reception intensity of the third measurement signal and a fourth reception intensity of the fourth measurement signal, and
      after receiving the third measurement signal and the fourth measurement signal and measuring the third reception intensity and the fourth reception intensity, when a ratio between the first reception intensity of the first measurement signal and the second reception intensity of the second measurement signal differs from a ratio between the third reception intensity of the third measurement signal and the fourth reception intensity of the fourth measurement signal, the mobile device transmits a second response signal to the on-vehicle device.

2. The wireless communication system according to claim 1, wherein
   the mobile device estimates a first transmission direction of the first measurement signal based on the first reception intensity of the first measurement signal, estimates a second transmission direction of the second measurement signal based on the second reception intensity of the second measurement signal, estimates a third transmission direction of the third measurement signal based on the third reception intensity of the third measurement signal, and estimates a fourth transmission direction of the fourth measurement signal based on the fourth reception intensity of the fourth measurement signal, and
   after the mobile device receives the third measurement signal and the fourth measurement signal with the multi-dimensional antenna from the on-vehicle device and estimates the third transmission direction of the third measurement signal and the fourth transmission direction of the fourth measurement signal, when a first difference between the first transmission direction and the third transmission direction is less than a first threshold and a second difference between the second transmission direction and the fourth transmission direction is less than a second threshold, the mobile device transmits the second response signal to the on-vehicle device.

3. The wireless communication system according to claim 2, wherein the first threshold is equal to the second threshold.

4. The wireless communication system according to claim 1, wherein
   after the mobile device receives the request signal, the first measurement signal, and the second measurement signal from the on-vehicle device, the mobile device transmits the first response signal to the on-vehicle device, the first response signal including at least a first transmission intensity of the first measurement signal and a second transmission intensity of the second measurement signal, after the on-vehicle device receives the first response signal, the on-vehicle device transmits the third measurement signal with a third transmission intensity from the first antenna, and transmits the fourth measurement signal with a fourth transmission intensity from the second antenna, the third transmission intensity corresponding to the first transmission intensity of the first response signal, the fourth transmission intensity corresponding to the second transmission intensity of the first response signal, and after the mobile device receives the third measurement signal from the first antenna and the fourth measurement signal from the second antenna, when the a first transmission direction of the first measurement signal corresponds to a third transmission direction of the third measurement signal and a second transmission direction of the second measurement signal corresponds to a fourth transmission direction of the fourth measurement signal and a first relationship between the first transmission intensity of the first measurement signal and the second transmission intensity of the second measurement signal, corresponds to a second relationship between the third transmission intensity of the third measurement signal received by the mobile device and the fourth transmission intensity of the fourth measurement signal received by the mobile device, the mobile device transmits the second response signal to the on-vehicle device.

5. The wireless communication system according to claim 4, wherein the mobile device determines:

whether the first transmission direction of the first measurement signal corresponds to the third transmission direction of the third measurement signal and whether the second transmission direction of the second measurement signal corresponds to the fourth transmission direction of the fourth measurement signal and whether the first relationship between the first transmission intensity of the first measurement signal and the second transmission intensity of the second measurement signal, corresponds to the second relationship between the third transmission intensity of the third measurement signal received by the mobile device and the fourth transmission intensity of the fourth measurement signal received by the mobile device.

6. The wireless communication system according to claim 1, wherein the first antenna of the on-vehicle device is located at a first portion of the vehicle, and the second antenna of the on-vehicle device is located at a second portion of the vehicle, the first portion of the vehicle being different from the second portion of the vehicle.

7. The wireless communication system according to claim 6, wherein the first portion of the vehicle is a side portion of the vehicle, and the second portion of the vehicle is a rear portion of the vehicle.

8. The wireless communication system according to claim 1, wherein the on-vehicle device outputs a command to unlock a door lock mechanism of the vehicle, when the on-vehicle receives the second response signal from the mobile device.

9. The wireless communication system according to claim 1, wherein a first timing at which the on-vehicle device transmits the first measurement signal, is different from a second timing at which the on-vehicle device transmits the second measurement signal, and wherein a third timing at which the on-vehicle device transmits the third measurement signal, is different from a fourth timing at which the on-vehicle device transmits the fourth measurement signal.

10. The wireless communication system according to claim 1, wherein the mobile device comprises a third antenna configured to transmit each of the first response signal and the second response signal, and wherein the on-vehicle device comprises a fourth antenna configured to receive each of the first response signal and the second response signal.

11. A wireless communication system, comprising:

a vehicle comprising a first antenna and a second antenna; and a mobile device comprising a multi-dimensional antenna, wherein:

the vehicle, in operation:

transmits a request signal and a first measurement signal from the first antenna, and transmits a second measurement signal from the second antenna, the mobile device, in operation:

receives the request signal, the first measurement signal, and the second measurement signal with the multi-dimensional antenna from the vehicle, and after receiving the request signal, the first measurement signal, and the second measurement signal, measures a first reception intensity of the first measurement signal and a second reception intensity of the second measurement signal, and transmits a first response signal to the on-vehicle device, the vehicle, in operation:

receives the first response signal, and after receiving the first response signal, transmits a third measurement signal from the first antenna, and a fourth measurement signal from the second antenna, the third measurement signal and the fourth measurement signal being transmitted at different timings, and the mobile device, in operation:

receives the third measurement signal and the fourth measurement signal with the multi-dimensional antenna at different timings from the vehicle, measures a third reception intensity of the third measurement signal and a fourth reception intensity of the fourth measurement signal, and after receiving the third measurement signal and the fourth measurement signal and measuring the third reception intensity and the fourth reception intensity, when a ratio between the first reception intensity of the first measurement signal and the second reception intensity of the second measurement signal differs from a ratio between the third reception intensity of the third measurement signal and the fourth reception intensity of the fourth measurement signal, the mobile device transmits a second response signal to the on-vehicle device.

12. The wireless communication system according to claim 11, wherein the mobile device estimates a first transmission direction of the first measurement signal based on the first reception intensity of the first measurement signal, estimates a second transmission direction of the second measurement signal based on second reception intensity of the second measurement signal, estimates a third transmission direction of the third measurement signal based on the third reception intensity of the third measurement signal, and estimates a fourth transmission direction of the fourth measurement signal based on the fourth reception intensity of the fourth measurement signal, and after the mobile device receives the third measurement signal and the fourth measurement signal with the multi-dimensional antenna from the vehicle and estimates the third transmission direction of the third measurement signal and the fourth transmission direction of the fourth measurement signal, when a first difference between the first transmission direction and the third transmission direction is less than a first threshold and a second difference between the second transmission direction and the fourth transmission direction is less than a second threshold, the mobile device transmits the second response signal to the vehicle.

13. The wireless communication system according to claim 12, wherein the first threshold is equal to the second threshold.

14. The wireless communication system according to claim 11, wherein:

after the mobile device receives the request signal, the first measurement signal, and the second measurement signal from the vehicle, the mobile device transmits the first response signal to the vehicle, the first response signal including at least a first transmission intensity of the first measurement signal and a second transmission intensity of the second measurement signal, after the vehicle receives the first response signal, the vehicle transmits the third measurement signal with a third transmission intensity from the first antenna, and transmits the fourth measurement signal with a fourth transmission intensity from the second antenna, the third transmission intensity corresponding to the first transmission intensity of the first response signal, the fourth transmission intensity corresponding to the second transmission intensity of the first response signal, and after the mobile device receives the third measurement signal from the first antenna and the fourth measurement signal from the second antenna, when a first transmission direction of the first measurement signal corresponds to a third transmission direction of the third measurement signal and a second transmission direction of the second measurement signal corresponds to a fourth transmission direction of the fourth measurement signal and a first relationship between the first transmission intensity of the first measurement signal and the second transmission intensity of the second measurement signal, corresponds to a second relationship between the third transmission intensity of the third measurement signal received by the mobile device and the fourth transmission intensity of the fourth measurement signal received by the mobile device, the mobile device transmits the second response signal to the vehicle.

15. The wireless communication system according to claim 14, wherein the mobile device determines:

whether the first transmission direction of the first measurement signal corresponds to the third transmission direction of the third measurement signal and the second transmission direction of the second measurement signal corresponds to the fourth transmission direction of the fourth measurement signal and the first relationship between the first transmission intensity of the first measurement signal and the second transmission intensity of the second measurement signal, corresponds to the second relationship between the third transmission intensity of the third measurement signal received by the mobile device and the fourth transmission intensity of the fourth measurement signal received by the mobile device.

16. The wireless communication system according to claim 11, wherein the first antenna of the vehicle is located at a first portion of the vehicle, and the second antenna of the vehicle is located at a second portion of the vehicle, the first portion of the vehicle being different from the second portion of the vehicle.

17. The wireless communication system according to claim 16, wherein the first portion of the vehicle is a side portion of the vehicle, and the second portion of the vehicle is a rear portion of the vehicle.

18. The wireless communication system according to claim 11, wherein the vehicle generates a command to unlock a door lock mechanism of the vehicle, when the on-vehicle receives the second response signal from the mobile device.

19. The wireless communication system according to claim 11, wherein a first timing at which the vehicle transmits the first measurement signal, is different from a second timing at which the vehicle transmits the second measurement signal, and wherein a third timing at which the vehicle transmits the third measurement signal, is different from a fourth timing at which the vehicle transmits the fourth measurement signal.

20. The wireless communication system according to claim 11, wherein the mobile device comprises a third antenna configured to transmit the first response signal and the second response signal, and wherein the vehicle comprises a fourth antenna configured to receive the first response signal and the second response signal.

* * * * *